March 23, 1937.  L. J. MASSOLO  2,074,797
PEDAL OPERATED AUTOMATIC GEAR CHANGE
Filed April 20, 1936   3 Sheets-Sheet 2
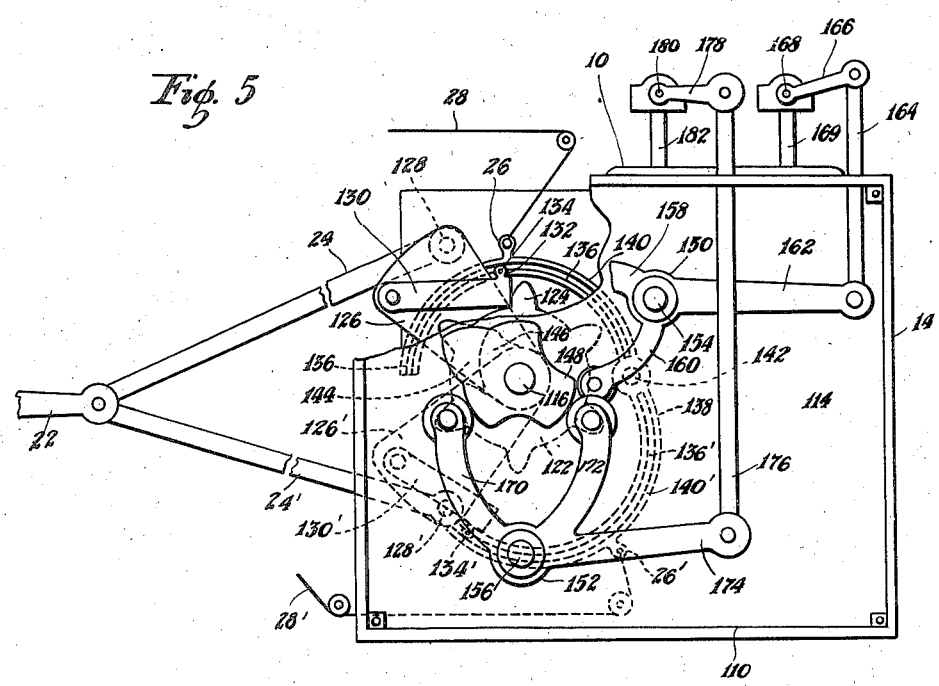
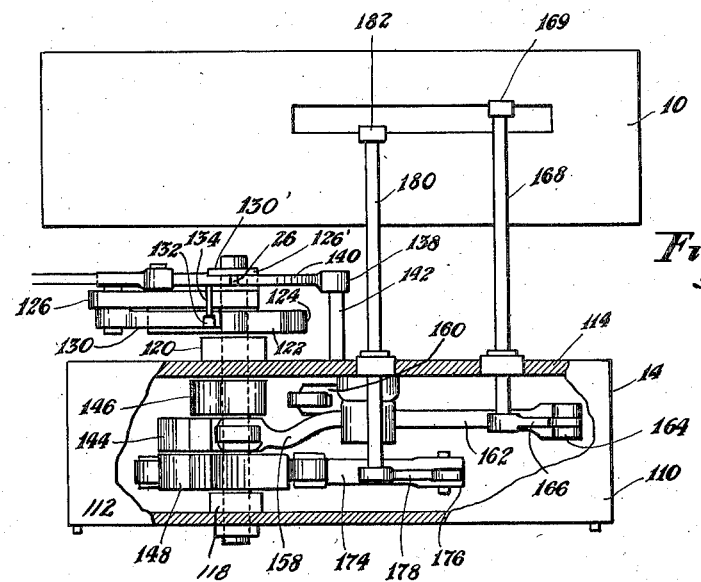
Inventor
L. J. Massolo
By E. F. Wenderoth
Attorney

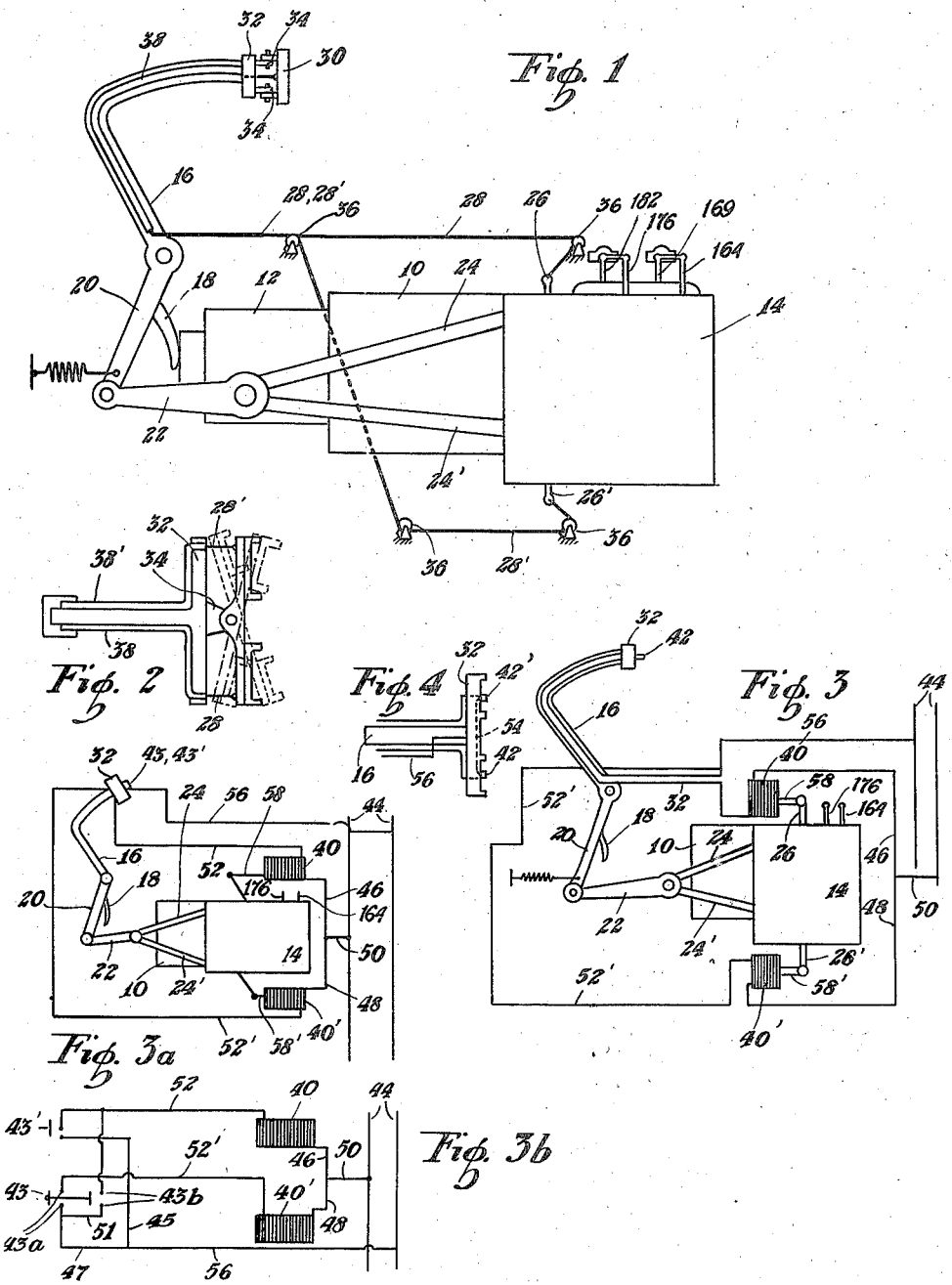

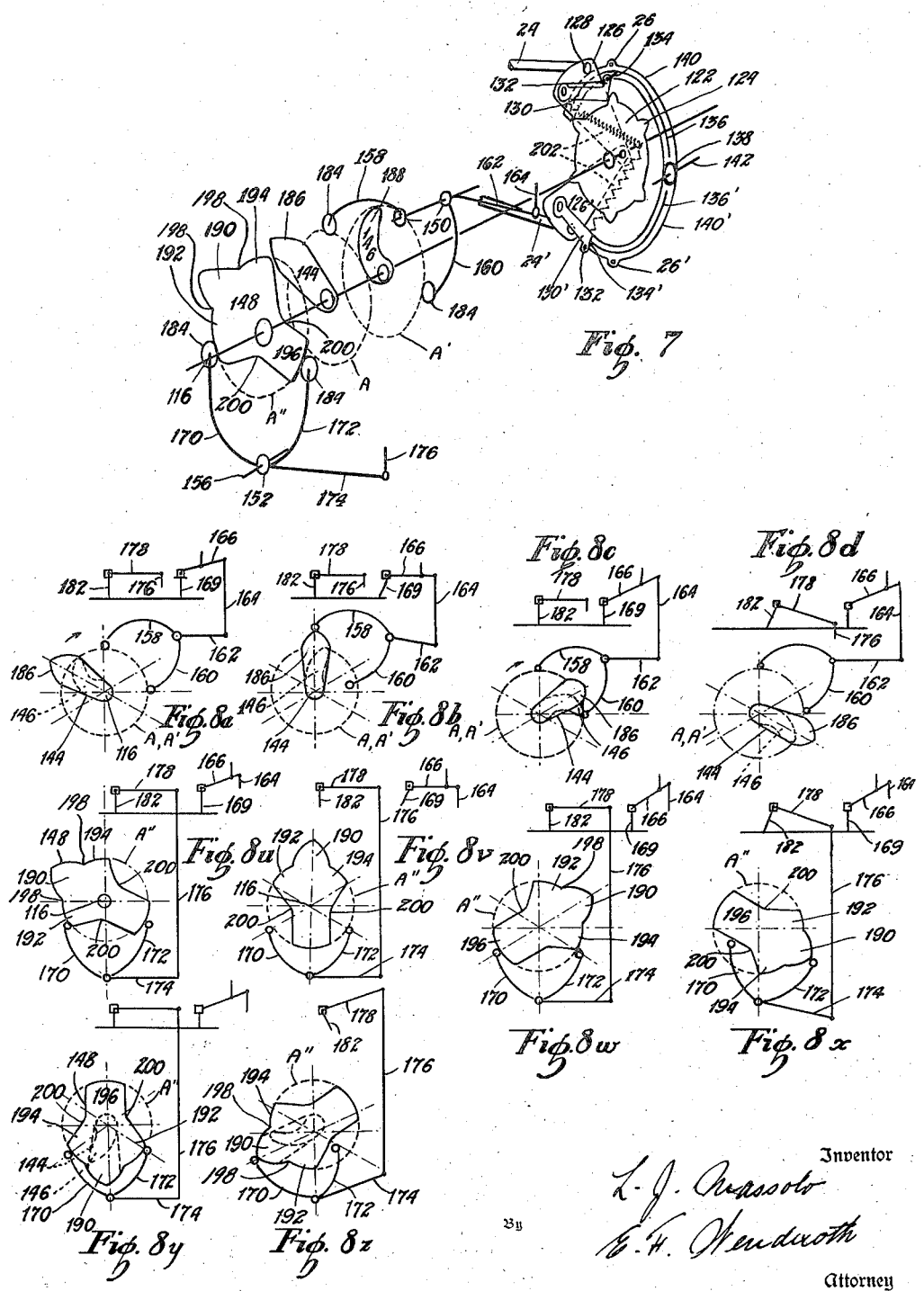

Patented Mar. 23, 1937

2,074,797

UNITED STATES PATENT OFFICE 2,074,797

PEDAL-OPERATED AUTOMATIC GEAR-CHANGE

Luis Juan Massolo, Buenos Aires, Argentina

Application April 20, 1936, Serial No. 75,475
In Argentina April 27, 1935

7 Claims. (Cl. 74—334)

The present invention relates to automatic gear-changes and in particular to an automatic gear-change which may readily be utilized in connection with systems for the transmission of mechanical power including a pedal or lever operated clutch, such for example as the transmission systems of mechanically propelled vehicles.

It is therefore an object of the present invention to provide a pedal operated gear-change system which includes a gear-box, a gear-selector unit operatively connected to said gear-box and designed when actuated in one direction to cause changing-up to be effected and when actuated in the opposite direction to cause changes-down to be effected and including a non-operative position, a clutch and a clutch-operating pedal operatively connected to the selector unit, and means operably associated with said pedal and with said unit and adapted to be actuated directly from said pedal for predetermining the manner in which the selector unit shall respond to actuation of the pedal.

A further object is to provide an improved mechanical selector unit having means which may readily be operatively connected to a clutch pedal for predetermining the manner in which the selector unit shall respond to actuation of the pedal.

Other objects and advantages of the present invention will become apparent during the course of the detailed description thereof.

In the drawings:

Fig. 1 is a diagram illustrating one embodiment of a pedal provided with means for predetermining the manner in which the selector unit shall respond to actuation of the pedal.

Fig. 2 is a plan of the pedal of Fig. 1.

Fig. 3 is a diagram illustrating an alternative embodiment of said predetermining means.

Fig. 3a is a line diagram and Fig. 3b a circuit diagram of a modified form of the embodiment of Fig. 3.

Fig. 4 is a plan of the pedal corresponding to Fig. 3.

Fig. 5 is a side elevation of an improved mechanical selector unit, with the cover removed and a portion cut away to show otherwise hidden parts.

Fig. 6 is a plan of the selector unit of Fig. 7 with portions of the top wall broken away.

Fig. 7 is an exploded and Figs. 8a to 8z are plain diagrams illustrating the construction and operation of the novel selector unit.

In Fig. 1 is shown a portion of the transmission system of an automobile, said portion comprising a gear-box 10, a clutch 12, a gear-selector unit 14 and a pedal 16 which is preferably the clutch-pedal. The clutch-pedal 16 has in addition to the clutch operating member 18 a lower arm 20 operatively coupled by means of a link 22 and actuating rods 24, 24' to the selector unit 14 which should comprise commutating means indicated in the figure as members 26, 26', whereby the operative relationship of the mechanism to the actuating rods is modified so as selectively to cause movement of said mechanism in one of two opposite senses in response to movement of said rods in a given direction or to disengage the mechanism from said rods whereby the pedal may be used as an ordinary clutch pedal without effecting a gear-change.

In accordance with one aspect of the present invention the members 26, 26' are connected to be actuated selectively by and from the pedal head to modify the operative relationship between said mechanism and said actuating rods so as to predetermine the manner in which the selector unit shall respond to actuation of the pedal. To this end the pedal is operatively connected to the members 26, 26' and control means are provided on the pedal head for setting said commutating means either before or during depression of the pedal as a whole, so as to cause the selector mechanism to be moved in the desired sense.

In the embodiment shown in Figs. 1 and 2, the connection means between the pedal and the members 26, 26' consists of cords or cables 28, 28' and the control means consists of a plate 30 pivotally mounted to the pedal head 32 between a pair of centrally disposed lugs 34 so as to be capable of oscillating in a plane normal to the pedal head. The ends of the cables 28, 28' are respectively secured to the members 26, 26' of the commutating means and to the ends of the plate 30, the cable 28 being, for example, secured to member 26 and to the left-hand end of plate 30 as seen from the driver's seat, and the cable 28' to the member 26' and to the right hand end of the plate 30. Guide means such as the wheels 36 and the tubes or casings 38, 38' are provided for guiding the cables in the desired directions, the arrangement, as shown in the diagram, being such that if the left-hand end of plate 30 be depressed with respect to the pedal head 32, the cable 28 is slackened to allow the member 26 to move for example under gravity or spring-tension from a mid-inoperative position to a position in which engagement between the mechanism of the selector unit and the actuating rod 24 is established and at the same time a pull is exerted on cable 28' to cause member 26' to move from its mid-inoperative position to an extreme position in which the parts adapted to establish engagement of rod 24' with the selector unit mechanism are still further removed from their engagement position. In these circumstances, the selector unit 14 will, upon depression of the pedal 16 as a whole, respond only to the thrust of rod 24 so that the selector mechanism will move in a predetermined sense. For example it will rotate clockwise when the device is viewed as shown in Fig. 1, to cause, say, upward changing of the gears in a manner which will be more fully described below.

Depression of the right-hand end of the plate 30 with respect to the pedal head 32 will have an inverse effect. That is to say, the member 26' will now be moved into a position to establish engagement between rod 24' and the selector mechanism whereas member 26 will be moved out of its operative to its extreme inoperative position so as to cause disengagement of rod 24 from the selector mechanism. Consequently upon depression of the pedal 16 as a whole, the selector mechanism will, in response to the thrust of rod 24', move in the opposite (counterclockwise) sense to cause downward changing of the gears. If the pressure is applied centrally to plate 30 so that the plate remains parallel to the pedal head 32, both the members 26, 26' will be moved into their mid-inoperative position and both the rods 24, 24' will be disengaged from the mechanism of the selector so that depression of the pedal as a whole will result in merely the ordinary clutching operations.

In the modification shown in Figs. 3 and 4 the operative connection between the pedal and the members 26, 26' is established by means of the solenoids 40, 40' and their circuits, the control means being normally open push-buttons or the like 42, 42' mounted on the pedal head 32. The solenoids are connected in parallel across a suitable supply circuit 44 (for example across the car battery circuit) on the one side by conductors 46, 48 and 50 and on the other side by conductors 52, 52' respectively, which extend to one pole of the respective push-button 42, 42' the other poles of which are connected by the common conductor 54 and the lead 56 to the other pole of the battery circuit.

The operation of this modification is similar to that of the embodiment of Fig. 1 except that in the case of Fig. 3 the pull on the members 26, 26' is applied by one or other of the solenoids 40, 40' instead of directly from the pedal by cables. Thus for instance, if in the arrangement of Figs. 3 and 4 the foot be applied to the left-hand end of the pedal head 32 so as to depress push-button 42 to close the circuit controlled thereby just before the pedal as a whole is depressed, the solenoid 40 will be energized to pull in its plunger 58, pivotally coupled to the member 26, the energizing circuit extending from one pole of the battery circuit through lead 56, common conductor 54, the contacts of push-button 42, conductor 52, solenoid winding 40, and conductors 46 and 50 to the other pole of the battery circuit 44.

The relationship of the member 26 to the mechanism of the selector unit may be so arranged that the pull of the solenoid will move said member 26 from its mid-inoperative position to an extreme inoperative position as in the case of Fig. 1, or contrariwise into its operative position to effect engagement of the rod 24 with said mechanism.

The parts may likewise be so disposed and connected that the commutator member is normally in a position to maintain rod 24 operatively coupled to the selector-mechanism so that when the pressure is applied to the central portion of the pedal head 32 upward gear changing follows. In such circumstances the solenoids 40, 40' and their circuits may be arranged as in Figs. 3a and 3b so that depression of push-button 43' energizes solenoid 40 by establishing a circuit extending from one pole of the battery leads 44, conductors 56 and 45, the contacts of push-button 43', conductor 52, solenoid winding 40 and conductors 46 and 50 to the other pole of battery leads 44. Energization of solenoid 40 alone, causes its plunger 58 to be drawn to the right in Fig. 3a thus moving member 26 of the commutator means to its extreme inoperative position and member 26' into its operative position to cause reversal of the movement of the selector-mechanism.

Depression of push-button 43 which has two sets of normally open contacts 43a and 43b causes both solenoids to be energized simultaneously by establishing parallel circuits, the one extending from one pole of the battery leads 44 along conductors 56 and 47, push-button contacts 43a, conductor 52', solenoid winding 40' and conductors 48 and 50 to the other pole of the battery leads 44, and the other circuit extending from a point of conductor 47 through conductor 51, push-button contacts 43b, conductor 53 to a point in conductor 52, along this conductor, through solenoid winding 40 and conductors 46 and 50 to the said other pole of the battery leads 44. By proper proportioning of the parts, simultaneous energization of both solenoids causes the commutator means to be moved into its mid or inoperative position in which it is held as long as button 43 is depressed thereby uncoupling the gear mechanism form rods 24, 24' and permitting use of the pedal for ordinary clutching operations.

From the foregoing it will readily be understood by those skilled in the art that whereas the novel pedal-operated control system can be applied to selector units of differing internal construction, nevertheless not all selector units are equally suitable since they must possess certain essential features to enable them to co-operate satisfactorily with the pedal control of the present invention. Consequently and in accordance with another aspect of the present invention, I prefer to use in conjunction with the novel control system and as forming a necessary part thereof, an improved type of selector unit illustrated in Figs. 5 to 8z inclusive.

With particular reference to Figs. 5, 6 and 7, the selector unit 14 comprises a housing 110 through the cover 112 of which (shown only in Fig. 6) and the opposite or rear wall 114 a shaft 116 extends transversely, one end of said shaft being supported in a bearing 118 provided in the cover while the other end of the shaft projects through a second bearing 120 in the rear wall 114 beyond the housing 110 and carries the actuating elements of the selector unit. The actuating elements comprise a disc 122 having, in the case of a three-speed gear-box, six radially projecting teeth 124 equally spaced about the circumference of the disc, which is fixedly mounted on the shaft 116 so as to turn with it. A pair of substantially sector-shape plates 126, 126' are loosely mounted on the shaft 116, and each of the plates 126, 126' has pivotally coupled to it in the neighbourhood of one end of the arcuate portion thereof one end of the respective actuating rod 24, 24' the corresponding pivots 128, 128' being preferably located at opposite extremes of said arcuate portions in the two plates. The other ends of the rods 24, 24' are pivotally coupled to the link 22 as in the case of Fig. 1.

Near the end of the arcuate portion remote from the pivot 128, 128', each sector-shape plate has pivotally mounted thereon a push-bar or pawl 130, 130' the free end of which is adapted to engage with one of the teeth 124 of the disc 122. Each of said pawls carries near its free end a lug 132 from which a pin 134, 134' projects into a groove 136, 136' in a commutating member 138 which comprises two substantially semi-circular arms 140, 140' rigidly connected together at one end in such wise that the pair of diameters include an acute angle. The commutating member 138 is pivotally mounted at the common point of its arms on a short shaft 142 which may conveniently project outwardly from the rear wall 114 of the housing 110, and each arm thereof is provided with a lug or eyelet 26, 26' adapted to have secured to it one end of the cables 28, 28', the other ends of which are connected to the control-plate 30 of the pedal (see Fig. 1). Alternatively the lugs or eyelets of the arms 140, 140' may have pivoted to them the plungers of solenoids if the embodiment of Fig. 3 is used.

The commutating member 138 is conveniently biased so as normally to lie in a mean or floating position in which the two arms 140, 140' are equidistant from the shaft 116. Said member 138 may for example be so biased by a pair of springs indicated at 202 in Fig. 7, one end of the springs being attached to the arms 140, 140' respectively and the other being anchored at some convenient common fixed point.

The selector mechanism itself is contained within the housing 110 and comprises three cams 144, 146, 148 fixedly mounted in axially spaced relationship on the shaft 116 and angularly disposed in a manner which will be hereinafter explained. A pair of gear-actuating members 150, 152 are pivotally mounted, each on its respective pin 154, 156 suitably supported in the housing so as to project parallel with shaft 116, the common centre-line of the shaft and one of said pins forming an angle of about 120° with the common centre-line of the shaft and said other pin.

The gear-actuating member 150 has a pair of operating arms 158, 160 lying in different parallel planes and a connecting arm 162 which extends away from the cams and is pivotally coupled at its end remote from the member 150 to a gear-actuating rod 164 which, in turn, is suitably connected, as by link 166 and rod 168 to the lever 169 of the gear-box 10, which controls the neutral and first speed positions. The second gear-actuating member 152 has a pair of coplanar operating arms 170, 172, and a connecting arm 174 similar to the connecting arm 162 and connected by means of push-rod 176, link 178 and rod 180 to the lever 182 controlling the second and third speeds. Each of the operating arms 158, 160, 170, 172 carries at its free end a cam-roller 184 adapted to engage the cam-surface of the respective cam. When both the gear-actuating members are in their normal or neutral position, all the rollers 184 are tangent to the surface of a common right cylinder the circular traces of which in the planes corresponding to the individual cams are shown at A, A' and A'' in Fig. 7. These traces will hereinafter be called the neutral circles since when the rollers are situated as above described, the gear-box is in neutral.

Of the cams, the pair 144, 146 is operatively associated with the gear-actuating member 150 which controls the neutral and first speed positions of the gear box. Cam 144 has a relatively narrow body portion through one end of which the shaft 116 passes. The other end terminates in a nose 186 which projects beyond the neutral circle A a sufficient distance to give the arm 158 the requisite lift to move lever 169 from the neutral to the first speed position. The angular position of cam 144 on the shaft 116 is such that when both the gear-actuating members 150, 152 are in their neutral position, cam 144 is one tooth-pitch to the side of the roller 184 of arm 158 remote from shaft 154, the pitch being that of the teeth on the disc 122. The cam 146 is substantially kidney-shape with the shaft 116 passing through one end thereof. Its free end 188 lies on the neutral circle A' and its angular position on the shaft 116 is such that the edge portion of its free end nearest to shaft 154 is substantially in alignment with the portion of the edge of cam 144 cut by the neutral circle A.

The third cam 148 has an outline roughly like that of the conventional fleur-de-lis with a central nose 190, a wing 192, 194 on either side thereof and a stem 196 extending diametrically opposite said central nose. The latter is similar to the nose 186 of cam 144, and the edges of the wings which merge into the nose, as well as the free end of the stem 196 are arcs of circles lying on the neutral circle A''. The edges which join the free ends of the wing and stem arcs form reentrants 198, 200 for a purpose to be explained hereinafter. The arcs of the wings and stem will hereinafter be referred to as "wing arcs" and "stem arcs" respectively, the wing arcs being distinguished as "leading" or "trailing", with the usual meaning of these words for rotating bodies.

Cam 148 has shaft 116 passing through it at a point representing the centre of the neutral circle A'' and its angular position is such that the centre-line of the nose 190 is in parallel alignment with the centre-line of cam 144.

The position of arm 158 with respect to the cam 144 has already been indicated. The remaining arms are so placed that the roller 184 of arm 170 is displaced circumferentially 120° in one direction from the point at which the roller of arm 158 touches the neutral circle, whereas the rollers of arms 172 and 184 are displaced 120° and 90°, respectively, in the opposite directions.

The operation of this device will now be described with reference to Figs. 7 and 8. The latter figure shows four successive positions 8a to 8d of the gear-actuating member 150 and its associated parts and four corresponding (simultaneous) positions 8u to 8x as well as two further positions of the gear-actuating member 152 and the parts associated therewith. Fig. 7 and Figs. 8a and 8u illustrate the selector mechanism in the neutral position at the commencement of a cycle of gear-change operations. In the following description it is supposed, unless otherwise stated, that when the pedal 16 (Figs. 1 and 3) is depressed, the pressure is applied in such position to the pedal head that the control member is set so as to produce upward changing and that for this purpose the mechanism of the selector rotates clockwise in Figs. 5, 7 and 8. When pressure is applied to the pedal as just stated, the commutating member 138 is moved counterclockwise about its pin 142 thereby causing arm 140 to approach shaft 116 under the pull of cable 28' (Fig. 1) and to move pawl 130 of plate 126 into a position to engage one of the teeth 124 of disc 122, by means of groove 136 and pin 134. Simultaneously the other arm 140' will be moved away from shaft 116 and will consequently move pawl 130' of plate 126' clear of said disc into an extreme inoperative position.

Upon depression of the pedal as a whole, a portion of the thrust is transmitted along the actuating rods 24 and 24' to cause the sector-shape plates 126 and 126' to rotate about shaft 116. On account of the relative positions of the parts, plate 126 will rotate clockwise and plate 126' counterclockwise and with the above-described setting of the parts, it is clear that the pawl 130 will by engaging with a tooth, push the disc 122 round in a clockwise direction. The parts are so proportioned that, for the case of a three speed gear-box, the disc 122 and consequently shaft 116 and the parts thereon will be rotated through 60° for every depression of the pedal. When the pedal is released, the actuating rods 24, 24' will be drawn back, carrying with them the plates 126, 126' and the pawl 130 will ride over the tooth which has just moved into the position previously occupied by the first mentioned tooth, and finally, upon release of the pressure the control element, and consequently the commutating member 138 will move into its neutral or inoperative position for example under the pull of springs 202, causing both pawls 130, 130' to be moved into their mid-inoperative position. The above cycle of operations occurs every time the pedal is depressed with the control member set for changing up. When the control member is set for changing down, the pawl 130 is moved into its extreme inoperative position and the pawl 130' is caused to engage the teeth 124 of disc 122 so as to rotate the latter in a counterclockwise direction.

With the selector mechanism in the neutral position shown in Figs. 7 and 8a, 8u, the rollers of the arms 170, 172 of member 152 are both in contact with arcuate portions of cam 148, the roller of arm 170 resting on the trailing wing arc (for clockwise rotation) and the roller of arm 172 on the stem arc. Gear-actuating member 152 is therefore locked in order to prevent an accidental or otherwise direct change into second or third. The arms of the other gear-actuating member 150, are, however free but are held in position with their rollers tangent to their respective neutral circles A and A' by the mechanical resistance of the gear-box mechanism. Upon rotation of shaft 116 through 60° clockwise as above described, the nose of cam 144 moves under the roller of arm 158 to lift the latter, which therefore pulls down rod 164 to move lever 169 into the first speed position, as shown in Fig. 8b. It will be noticed that no obstruction is offered to arm 160 so that it can move inwards towards the shaft 116 in response to the outward movement of its companion arm 158. Simultaneously cam 148 moves into the position shown in Fig. 8b in which the reentrants 200 are opposite the rollers of arms 170 and 172, which are thus freed, but the gear-actuating member 152 of which they are a part is held in inoperative position because of the engagement of first speed in the gear-box. A second depression of the pedal will cause the shaft 116 to be moved a further 60°. This causes the nose 186 of cam 144 to be withdrawn from under the roller of arm 158 and the free end of cam 146 to move under the roller of arm 160 thus positively moving the latter into neutral position whereby rod 164 is pushed up and lever 169 moved back into neutral, as shown in Fig. 8c. Cam 148 will simultaneously have moved again into a position to lock the gear-actuating member 152, as seen in Fig. 8w, but now the leading wing arc contacts with the roller of arm 172 and the stem arc with that of arm 170. The third depression of the pedal causes both cams 144 and 146 to be moved clear of the gear-actuating member 150, which from now on remains floating (see Fig. 8d). Cam 148, however, has now moved its nose 190 into contact with the roller of arm 172, which is therefore moved away from shaft 116 to pull down rod 176 and thereby move lever 182 into the second speed position, (Fig. 8x). Arm 170 as will be seen is free to move towards the shaft 116 because one of the reentrants 200 is opposite said arm. The fourth depression of the pedal causes cam 148 to move into a position in which the wing arcs are in contact with the arm rollers (Fig. 8y) the respective gear-actuating member 152 being then brought back to its neutral position, thus causing rod 176 to be pushed up and lever 182 to move into neutral. The fifth depression of the pedal causes the nose 190 of cam 148 to be brought into contact with the roller of arm 170 which is moved away from shaft 116 to push up rod 176 and move lever 182 into third speed position whereas arm 170 now moves into the other reentrant 200 (see Fig. 8z). A sixth depression of the pedal would bring the parts into their original position shown in Figs. 7 and 8a and 8u.

For changing down, the operative positions of the selector mechanism are similar but the parts rotate in the opposite direction and the sequence of phases is reversed. To provide for reverse, it is necessary to supplement the selector by a hand-operated reversing switch or push-button or the like.

What I claim is:

1. In an automatic gear-change system comprising a gear-box, a gear-selector mechanism operatively coupled to said gear-box and commutating means in said mechanism having two opposed and one free positions, a pedal operatively coupled to the gear-selector mechanism and having a head, a centrally disposed lug projecting from said head on either side thereof, a plate pivotally mounted between said lugs, a cable extending from one end of said plate to a point on one side of said commutating means, a second cable extending from the other end of the plate to a point on the opposite side of the commutating means, and guides for said cables, whereby upon depression of one end of said plate with respect to said head the commutating means is brought into one operative position to predetermine operation of the gear-selector mechanism in one direction, and upon similar depression of the other end of the plate the commutating means is brought into its opposed operative position to predetermine operation of the gear-selector mechanism in the opposite direction, pressure upon the central portion of the plate maintaining the same in balanced position whereby the commutating means is maintained in its free position thus disengaging the coupling between the pedal and the gear-selector mechanism.

2. In an automatic gear-changing system comprising a gear-box, a gear-selector mechanism operatively coupled to the gear-box and commutating means in said selector-mechanism having two opposed operative and one free positions, a pedal operatively coupled to the gear-selector mechanism and having a head, means operative to position said commutating means in one of its three positions and push-buttons on said head adapted upon depression to cause operation of said operative means.

3. In an automatic gear-changing system comprising a gear-box, a gear-selector mechanism operatively coupled to the gear-box, and commutating means in said mechanism having two opposed operative and one free positions, a pedal operatively coupled to the selector-mechanism and having a head, push-buttons mounted on said head, a pair of solenoids, a plunger located within the field of each solenoid, one of said plungers being coupled at one end to a point on one side of the commutating means and the other plunger being coupled at one end to a point on the opposite side of the commutating means, a source of electric current and electrical connections extending between said source and said solenoids and including said push-buttons whereby the excitation of the solenoids and therefore the setting of the commutating means may be selectively controlled from the pedal head in response to depression of the push-buttons.

4. In an automatic gear-change system comprising a gear-box, a gear-selector mechanism operatively coupled to said gear-box, and commutating means in said mechanism having two opposed operative and one free positions and normally biased to one of said operative positions, a pedal operatively coupled to the gear-selector mechanism and having a head, a source of electric current, a solenoid having a plunger coupled to a point on one side of said commutating means, a second solenoid having a plunger coupled to a point on the opposite side of the commutating means, a push-button having a pair of normally open contacts mounted on said head near one end thereof, a second push-button having two pairs of normally open contacts mounted on said head near the other end thereof and electrical connections connecting said solenoids in parallel across said source and through said contacts in such wise that depression of the first-named push-button will cause energization of one of said solenoids to move the commutating means from its normal to its opposed operative positions and depression of the second push-button will cause energization of both solenoids to move said commutating means into its free position.

5. An automatic gear-change system comprising a gear-box having a gear-changing means controlling the neutral and first speed positions and a second gear-changing means controlling the second and third speed positions of said gear-box and having a neutral position, a clutch, a pedal operatively associated with said clutch, a gear-selector mechanism operatively associated with said gear-box and connected to be actuated by said pedal and including commutating means, and control means on said pedal operatively connected to said commutating means, wherein said gear-selector mechanism comprises a housing, a shaft rotatably mounted within the housing, a plurality of cams fixedly mounted in axially spaced relationship on said shaft, a pair of pins parallel with said shaft and fixed to said housing, a gear-actuating member rotatably mounted on one of said pins and comprising an arm having a roller at its free end lying in the path of one of the cams, a second arm having a roller at its free end lying in the path of another of said cams and a connecting arm operatively coupled to the first-named gear-changing means, a second gear-actuating member rotatably mounted on the other of said pins and comprising a pair of arms each having a roller at its free end lying in the path of a third of said cams and at different points of said path, and a connecting arm operatively coupled to the second gear-changing means.

6. In an automatic gear-change system comprising a gear-box, a gear-selector mechanism operatively coupled to said gear-box and including a driven shaft and commutating means, a pedal, control means connected between said pedal and said commutating means, and means operatively coupling said pedal to said driven shaft, said means including a toothed disc fixedly mounted on the driven shaft, a pair of substantially sector-shape members loosely mounted on said shaft in angularly spaced relationship, a pawl pivotally mounted on each of said sector-shape members at opposite ends of the arcuate portions thereof and having free ends adapted to engage the teeth of said disc, a pair of actuating rods each pivoted at one end to a sector at the extremity of the arcuate portion thereof remote from the pawl and pivotally coupled at their other ends to one end of a link the other end of which is pivoted to said pedal, means being provided on said pawls for operatively coupling them to said commutating means.

7. In an automatic gear-change system comprising a pedal, a gear-box having gear-changing means, a gear-selector mechanism including a housing, a driven shaft rotatably mounted in said housing and having an end projecting therebeyond, means in said housing operatively connected to said shaft and said gear-changing means, means on said shaft operatively connected to said pedal and including a toothed disc fixed on said shaft and a pair of substantially sector-shape members loosely mounted in angularly spaced relationship on said shaft and a pawl pivoted on each sector and having a free end adapted to engage with the teeth of said disc, a lug on each pawl in the neighbourhood of said free end, a pin projecting from said lug, a pivot projecting outwardly of the housing and parallel with said shaft, a commutating member pivotally mounted on said pivot and comprising a common boss and a pair of substantially semi-circular arms extending therefrom, the diameters of said arms including an acute angle, a groove in said arms substantially coextensive therewith, said groove receiving the free ends of said pins, control means for said commutating means connected to said pedal and means on the arms of the commutating member operatively connected to said control means.

LUIS JUAN MASSOLO.